United States Patent
Miller et al.

(10) Patent No.: US 8,305,206 B2
(45) Date of Patent: Nov. 6, 2012

(54) SYSTEM AND METHOD FOR DYNAMICALLY GENERATING A SPEED ALERT BASED ON DRIVER STATUS

(75) Inventors: Thomas Lee Miller, Ann Arbor, MI (US); Kenneth Nkosi Williams, Canton, MI (US); Brian Bennie, Sterling Heights, MI (US); Vilay Patel, Canton, MI (US); Robert Bruce Kleve, Farmington, MI (US); Andrea Bowes Chowanic, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 601 days.

(21) Appl. No.: 12/535,146

(22) Filed: Aug. 4, 2009

(65) Prior Publication Data

US 2011/0032093 A1 Feb. 10, 2011

(51) Int. Cl.
*B60Q 1/00* (2006.01)
(52) U.S. Cl. ............... 340/441; 701/32.4; 701/70
(58) Field of Classification Search .......... 340/441, 340/439, 905; 180/170, 171; 701/32.4, 70, 701/93, 119
See application file for complete search history.

(56) References Cited

U.S. PATENT DOCUMENTS

| | | | |
|---|---|---|---|
| 3,878,915 A | 4/1975 | Purland et al. | |
| 4,229,727 A * | 10/1980 | Gilhooley | 340/905 |
| 5,769,051 A | 6/1998 | Bayron et al. | |
| 5,803,043 A | 9/1998 | Bayron et al. | |
| 5,819,198 A * | 10/1998 | Peretz | 701/119 |
| 6,515,596 B2 | 2/2003 | Awada | |
| 6,556,905 B1 * | 4/2003 | Mittelsteadt et al. | 701/32.4 |
| 6,772,061 B1 | 8/2004 | Berthiaume et al. | |
| 6,952,156 B2 | 10/2005 | Arshad et al. | |
| 6,998,956 B2 | 2/2006 | Dix | |
| 7,075,409 B2 | 7/2006 | Guba | |
| 7,227,283 B2 | 6/2007 | Suzuki | |
| 7,363,139 B2 | 4/2008 | Glora et al. | |
| 7,375,624 B2 * | 5/2008 | Hines et al. | 340/441 |
| 7,391,305 B2 * | 6/2008 | Knoll et al. | 340/441 |
| 7,463,896 B2 | 12/2008 | Himmelstein | |
| 7,589,643 B2 * | 9/2009 | Dagci et al. | 340/905 |

(Continued)

FOREIGN PATENT DOCUMENTS

DE 3220083 A1 12/1983

(Continued)

OTHER PUBLICATIONS

"Rider Customization Settings", 2007, Segway Inc., 2 pages.

(Continued)

*Primary Examiner* — John A Tweel, Jr.
(74) *Attorney, Agent, or Firm* — Brooks Kushman P.C.; Jennifer M. Stec

(57) ABSTRACT

In at least one embodiment, a method for generating a speed alert with an electronic device in a vehicle is provided. The method comprises receiving a vehicle speed signal indicating the speed at which the vehicle is traveling on a road and receiving a speed limit signal indicating the posted speed limit for the road traveled by the vehicle. The method further comprises adding a predetermined speed buffer to the posted speed limit and comparing the posted speed limit and the predetermined speed buffer to the vehicle speed signal. The method further comprises generating an alert if the vehicle speed signal is greater than the posted speed limit and the predetermined speed buffer.

16 Claims, 4 Drawing Sheets

U.S. PATENT DOCUMENTS

| | | | |
|---|---|---|---|
| 7,626,494 B2 | 12/2009 | Yamamoto et al. | |
| 7,656,280 B2 * | 2/2010 | Hines et al. | 340/441 |
| 7,711,468 B1 * | 5/2010 | Levy | 701/70 |
| 7,757,803 B2 | 7/2010 | Fiske et al. | |
| 7,907,063 B2 * | 3/2011 | Simon | 340/905 |
| 7,959,177 B2 | 6/2011 | Fiske et al. | |
| 8,103,412 B2 | 1/2012 | Miller et al. | |
| 2002/0170762 A1 | 11/2002 | Daneshmand | |
| 2004/0263316 A1 | 12/2004 | Dix et al. | |
| 2006/0155439 A1 | 7/2006 | Slawinski et al. | |
| 2006/0271265 A1 | 11/2006 | Kawazoe et al. | |
| 2007/0067086 A1 | 3/2007 | Rothschild | |
| 2008/0030316 A1 | 2/2008 | Flick | |
| 2008/0275604 A1 | 11/2008 | Perry et al. | |
| 2012/0065862 A1 | 3/2012 | Fiske et al. | |

FOREIGN PATENT DOCUMENTS

| | | |
|---|---|---|
| DE | 19961619 A1 | 6/2001 |
| GB | 2273580 A | 6/1994 |
| JP | 1047630 A | 2/1989 |
| JP | 2005254975 A | 9/2005 |
| WO | 9204696 A1 | 3/1992 |

OTHER PUBLICATIONS

Volvo Car Corporation, "Sustainability Report", 2005, 20 pages.
www.youtube.com, Auto Makers Offer Safety Systems for High-Risk Teen, May 4, 2007, 1 page.
www.gizmag.com/go/4448, "Volvo experimenting with new safety features", Aug. 17, 2005, 4 pages.
www.autos.ca/forum/index.php?topic=39661.0, "Volvo-Key to Safety At Start Up", Aug. 27, 2005, 6 pages.
www.carpages.co.uk/volvo/volvo-safety-concepts-02-09=05.asp, "Volvo's Latest Safety Concepts Aim to Help Road Safety", Sep. 2, 2005, 3 pages.
strangenewproducts.com/2005/08/volvos-multi-lock-system-prevents.html, "Volvo's Multi-lock System Prevents Drunk Driving", Aug. 22, 2005, 5 pages.
www.conceptcaronline.com/news/technology/cardesignnews26.php, "Volvo's Seat-Belt Breathalyser", Aug. 19, 2005, 2 pages.
English translation of DE 199 61 619 A1, Jun. 28, 2001, 5 pages.
Patty Mattern, "Getting smarter at getting safer", University of Minnesota, UMNnews, Sep. 13, 2005, 2 pages.

* cited by examiner

SYSTEM AND METHOD FOR DYNAMICALLY GENERATING A SPEED ALERT BASED ON DRIVER STATUS

BACKGROUND

1. Technical Field

The embodiments of the present invention generally relate to a system and method for dynamically generating a speed alert based on driver status.

2. Background Art

With conventional automotive vehicles, one or more keys are often shared between any number of drivers (e.g., parent/teen, employer/employee, owner/valet driver, or fleet vehicle owner/fleet vehicle driver). In one example, the parents of a teenager (or young adult) that is old enough to drive may provide the keys of the vehicle to the teenager. The vehicle may be equipped with various safety and/or driver notification features that may be enabled/disabled via a user interface based on the driver's needs. However, in some circumstances, the parent may not intend to have the various safety and notification related features disabled by the teenager. The parent may enable the safety and notification features prior to allowing the teenager to drive the vehicle, however there is no guarantee that the teenager may keep the safety and notification features enabled while driving the vehicle. Conventional vehicles fail to give parents, or other primary drivers, the option of preventing teenagers that are eligible to drive or other such secondary drivers from disabling safety and notification features.

The speed at which a teen (or other secondary driver) drives the vehicle may be of concern for parents, employers, and/or consumers of valet services. Speed limiting devices are known to exist in automotive technology. However, such devices generally depend on a single speed value (that is programmed into the device by the manufacturer) and are not capable of dynamically being changed on the fly to adapt to, or incorporate new speed limits as the secondary driver drives the vehicle.

SUMMARY

In at least one embodiment, a method for generating a speed alert with an electronic device in a vehicle is provided. The method comprises receiving a vehicle speed signal indicating the speed at which the vehicle is traveling on a road and receiving a speed limit signal indicating the posted speed limit for the road traveled by the vehicle. The method further comprises adding a predetermined speed buffer to the posted speed limit and comparing the posted speed limit and the predetermined speed buffer to the vehicle speed signal. The method further comprises generating an alert if the vehicle speed signal is greater than the posted speed limit and the predetermined speed buffer.

In at least another embodiment, an apparatus for generating a speed alert in a vehicle for one of a primary driver and a secondary driver is provided. The apparatus comprises a device configured to receive a driver status signal indicating that the driver of the vehicle is the secondary driver and to receive a vehicle speed signal indicating the speed at which the vehicle is being driven on a road by the secondary driver. The device is further configured to receive a speed limit signal indicating the posted speed limit for the road and to compare the posted speed limit to the vehicle speed signal. The device is further configured to generate an alert for the secondary driver if the vehicle speed signal is greater than the posted speed limit.

In at least another embodiment, an apparatus for generating a speed alert in a vehicle for one of a primary driver and a secondary driver is provided. The apparatus comprises a device configured to receive a driver status signal indicating that the driver of the vehicle is the secondary driver and to receive a vehicle speed signal indicating the speed at which the vehicle is being driven on a road by the secondary driver. The device is further configured to receive a speed limit signal indicating the posted speed limit for the road and to store a predetermined speed buffer. The device is further configured to compare the posted speed limit and the predetermined speed buffer to the vehicle speed signal and to generate an alert for the secondary driver if the vehicle speed signal is greater than the posted speed limit and the predetermined speed buffer.

DETAILED DESCRIPTION

The embodiments of the present invention generally identifies the driver of the vehicle whereby primary and secondary drivers are determined and various levels of control are granted to the driver based on whether the driver is the primary driver or the secondary driver. In general, the primary driver (e.g., a parent, employer, consumer of valet services, fleet vehicle owner) may be defined as the administrative driver who has greater control over the functionality of the various features (e.g., safety features and/or safety notification features) in the vehicle. For example, the primary driver may enable or disable the various features in the vehicle. The secondary driver may be defined as a restricted driver who has limited control in enabling and disabling features generally provided by the vehicle and is to abide by the functional restrictions imposed or selected by the vehicle or the primary driver. For example, the primary driver may enable the features for the secondary driver, and the secondary driver is not capable of disabling such features when enabled by the primary driver.

The embodiments of the present invention generally provide, among other things, a system and method for dynamically generating a speed alert based on driver status. For example, electrical device(s) in the vehicle may determine driver status (e.g., whether the driver is the primary driver or the secondary driver) and dynamically detect various posted speed limits and alert the secondary driver and/or control the speed at which the secondary driver drives the vehicle based on the posted speed limits.

The embodiments of the present invention as set forth in FIGS. 1-4 generally illustrate and describe a plurality of controllers (or modules/devices), or other electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired in the vehicle. It is generally recognized that each controller and/or module/device disclosed herein may include, but not limited to, any number of microprocessors, ICs, memory devices (e.g., FLASH, RAM, ROM, EPROM, EEPROM, or other suitable variants thereof), and software which co-act with one another to perform the various functions set forth below.

Figure 1:
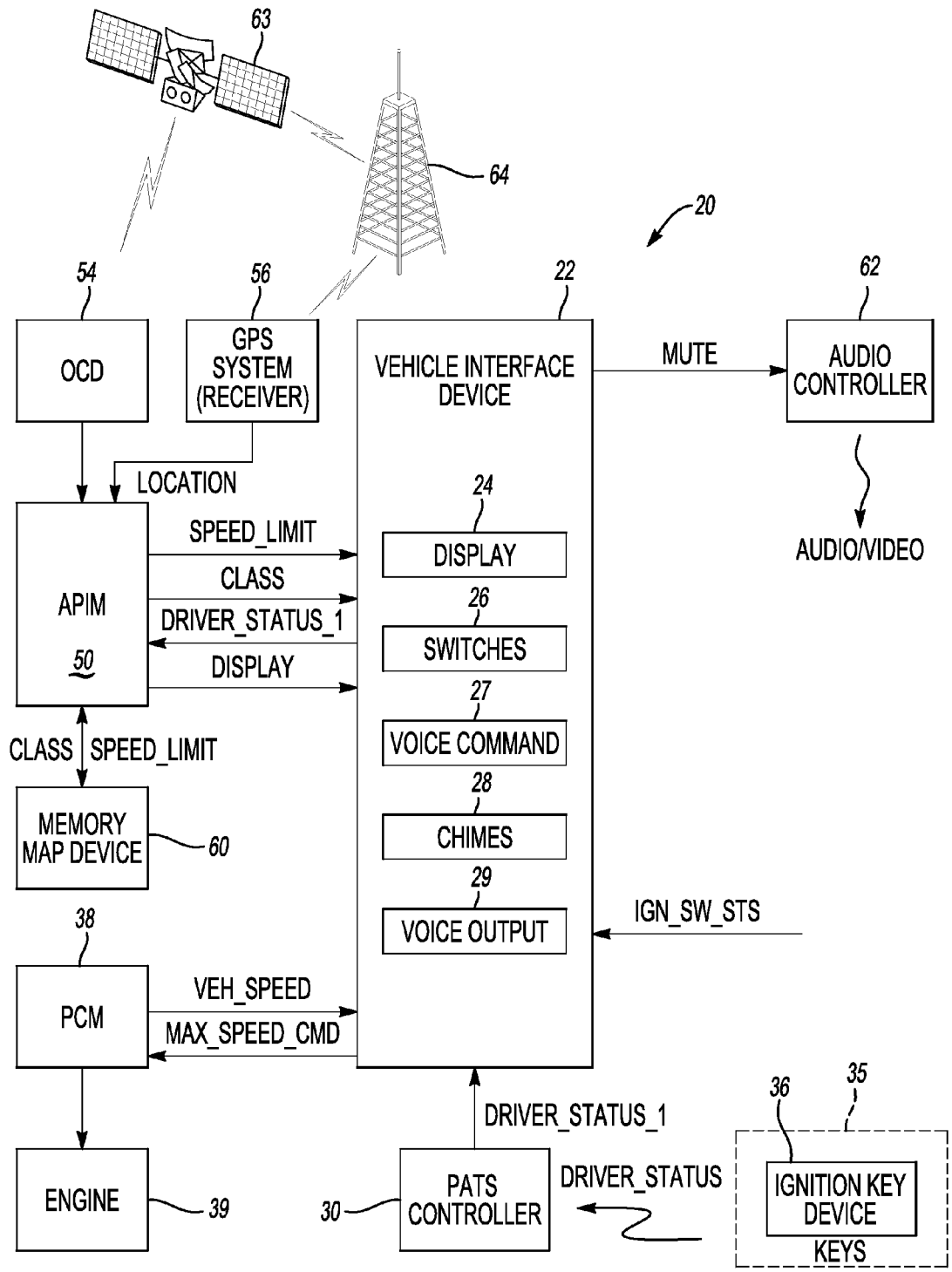
FIG. 1 depicts a system for differentiating between primary and secondary drivers of a vehicle and for dynamically generating a speed alert based on driver status in accordance to one embodiment of the present invention.

FIG. 1 depicts a system 20 for differentiating between primary and secondary drivers of a vehicle and for dynamically generating a speed alert based on driver status in accordance to one embodiment of the present invention. In general, the system 20 is configured to dynamically detect the posted speed limits for a road traveled by a given driver and to generate an alert in response to detecting that the vehicle is traveling at a speed that is over posted speed limit. In yet another example, the system 20 is configured to dynamically detect the posted speed for a road traveled by a given driver and to control the speed of the vehicle in response to detecting that the vehicle is traveling at a speed that is over the posted speed limit. The system 20 may perform the aforementioned operations in the event the driver is the secondary driver. It is contemplated that the system 20 may perform the aforementioned operations irrespective of the status of the driver.

The system 20 generally comprises a vehicle interface device 22. The device 22 includes a display 24 that provides information related to the various states of vehicle functionality to the driver. For example, the display 24 may provide, but not limited to, a driver identification message during vehicle startup, various administrative menu options, a seatbelt warning message, a speed limit start up message, vehicle near top speed message, top speed message, driver identification speed warnings, and/or an inhibit ESC and FCW message.

The device 22 also includes a plurality of switches 26, a voice recognition command interface 27, chimes 28, and voice output capability 29. The driver may toggle the switches 26 to view different messages and/or select various options. The voice recognition command interface 27 may enable the vehicle to receive commands from the driver so that the driver may audibly input commands and/or responses. One example of a voice recognition command interface is disclosed in U.S. Patent Publication No. 20040143440 ("the '440 publication"), entitled "Vehicle Speech Recognition System", filed Dec. 31, 2003.

The chimes 28 may audibly notify the driver when predetermined vehicle conditions have been met. In one example, the device 22 may activate the chimes 28 when the vehicle is near a top speed, the vehicle has achieved a top speed, the vehicle has exceeded the top speed, there is a low level of fuel in the fuel tank, and/or when the traction control is enabled. In one example, the voice output capability 29 enables the device 22 to transmit audio signals to the driver in the manner, but not limited to, that described in the '440 publication. While the display 24, the switches 26, the voice input command interface 27, chimes 28, and the voice output capability 29 are shown within the device 22, it is contemplated that one or more of these mechanisms may be positioned exterior to the device 22.

A passive anti-theft security (PATS) controller 30 is operably coupled to the device 22. While FIG. 1 generally illustrates that the PATS controller 30 is positioned outside of the device 22, other implementations may include the PATS controller 30 being implemented directly within the device 22. In general, one or more of the signals transmitted to/from the device 22 may be transmitted via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys 35. The device 22 may receive a signal IGN_SW_STS from a body controller (not shown) to determine the position of the ignition switch. The keys 35 may be tagged or associated with the primary driver or the secondary driver of the vehicle. The key 35 includes an ignition key device 36 embedded therein for communicating with the vehicle. The ignition key device 36 may be in the form of a transponder (not shown) that includes an integrated circuit and an antenna. The transponder is adapted to transmit an electronic code as a signal DRIVER_STATUS to a receiver (not shown) in the PATS controller 30. The signal DRIVER_STATUS may be indicative of which driver (e.g., primary or secondary) is driving the vehicle. The signal DRIVER_STATUS may be in the form of a radio frequency (RF) based signal or a radio frequency identification (RFID) tag that corresponds to binary data. The PATS controller 30 determines if the RF based data in the signal DRIVER_STATUS matches predetermined data stored therein (e.g., in a look up table of the PATS controller 30) prior to allowing the vehicle to start for anti-theft purposes. In the event the RF based data matches the predetermined data, a powertrain control module (PCM) 38 (or engine controller) operably coupled to the PATS controller 30 enables an engine 39 to start. In general, the vehicle assembly plant, supplier facility (e.g., manufacturer of the keys and/or PATS controller 30), car dealership, or vehicle owner performs the operation of learning the data transmitted by the keys 35. The PATS controller 30 may also use the data on the signal DRIVER_STATUS for purposes of identifying whether the driver of the vehicle is the primary driver or the secondary driver.

The PATS controller 30 may transmit a signal DRIVER_STATUS_1 to indicate whether the driver is the primary driver or the secondary driver. Prior to the PATS controller 30 transmitting the signal DRIVER_STATUS_1, the keys 35 need to be programmed as a primary key or as a secondary key. The manner in which the keys 35 are designated as either a primary key or a secondary key is set forth in one or more of the following U.S. patent Ser. Nos. 12/139,005, entitled "SYSTEM AND METHOD FOR PROGRAMMING KEYS TO VEHICLE TO ESTABLISH PRIMARY AND SECONDARY DRIVERS" and filed on Jun. 13, 2008; 12/433,642, entitled "SYSTEM AND METHOD FOR ASSIGNING DRIVER STATUS TO A SPARE KEY AND FOR PROGRAMMING THE SPARE KEY TO A VEHICLE" and filed on Apr. 30, 2009; and PCT/US2009/048261 entitled "SYSTEM AND METHOD FOR CONTROLLING AN ENTERTAINMENT DEVICE IN A VEHICLE BASED ON DRIVER STATUS AND A PREDETERMINED VEHICLE EVENT" and filed on Jun. 23, 2009, all of which are hereby incorporated by reference in their entirety.

An auxiliary protocol interface module (APIM) (or communication module) 50 is operably coupled to the device 22. The APIM 50 is configured to receive an occupant communication device (OCD) 54. The APIM 50 is generally part of an in-vehicle communication system which interfaces with the OCD 54 to enable voice input control to perform a function with the OCD 54 so that the driver does not have to enter data directly into the OCD 54. The APIM 50 may interface via switches (not shown) positioned within the vehicle to enable touch selection control to perform a function with the OCD 54 so that the driver does not have to enter data directly into the OCD 54. The OCD 54 is wirelessly coupled to the APIM 50. In one example, the APIM 50 may be implemented as part of the SYNC system developed by Ford Motor Company® and Microsoft®. The OCD 54 may include any number of communication devices that use a wireless protocol. For example, one such wireless protocol may include Bluetooth™. The OCD 54 may use any protocol that is generally situated to facilitate wireless communication. The OCD 54 may be a phone, a text messaging device, a music generating device (such as a phone that plays MP3 songs) whereby all of such items use the Bluetooth™ protocol to communicate. In yet another example, the OCD 54 may include other devices such as Universal Serial Bus (USB) based music playback devices (e.g., Zune™ and iPod® by Apple®). In yet another example, the OCD 54 may include a link that is hardwired coupled into a line-in input provided on the APIM 50. Such a link may receive an input from music playback device to transmit audio via speakers in the vehicle.

In general, the APIM 50 may receive any mobile communication device or digital media player and allow the vehicle occupant to operate such devices via voice input and/or touch input. Switches may be positioned on the APIM 50, the vehicle's steering wheel (not shown), an audio controller 62, or on the device 22 to enable touch input. In the event the OCD 54 comprises a wireless protocol based text messaging device that is coupled to the APIM 50, the vehicle occupant may be presented with a listing of pre-selected text messages from the APIM 50 for the occupant to select via touch input and/or voice input to transmit the selected text to another user.

A global positioning satellite (GPS) system 56 that includes a receiver (not shown) is operably coupled to the APIM 50 via the data communication bus. The GPS system 56 enables the driver of the vehicle to locate a particular destination by providing the driver with driving directions to reach the particular destination. The GPS system 56 is configured to provide a signal LOCATION to the APIM 50. The signal LOCATION corresponds to coordinate data that is used to identify the location of the vehicle. The GPS system 56 may use the coordinate data that is used to identify the location of the vehicle to, among other things, obtain driving directions to reach a particular destination. The data on the signal LOCATION may comprise latitude and longitudinal information corresponding to the various locations of the vehicle while driven by the primary driver or the secondary driver. In general, a plurality of satellites 63 and/or a plurality of ground stations 64 communicate with the GPS system 56 to establish the location of the vehicle. For example, the GPS system 56 is capable of establishing the vehicle's position and velocity relative to the earth's surface processing data received from the plurality of satellites 63 and/or the ground stations 64.

As the vehicle moves latitudinally and/or longitudinally across the earth's surface, the GPS system 56 is capable of presenting the position of the vehicle with reference coordinates that correspond to, among other things, the latitude and longitude on the earth's surface. It is generally known that the implementation of a GPS system 56 on a vehicle is capable of providing the position of the vehicle via latitude and longitude coordinates relative to the earth's surface.

A memory map device 60 having, but not limited to, topographical maps stored therein may be received by the APIM 50 so that a pictorial map of the location in which the vehicle is positioned in real time can be provided over a signal DISPLAY to the device 22. The memory map device 60 also includes posted speed limits for a particular road that is being driven on by the driver or functional class information for a particular road that is being driven on. In one example, the memory map device 60 may be a secure data (SD) card. Such SD cards are known to include pictorial map data, posted speed limits, and/or functional class information that can be provided to the driver. The APIM 50 may merge the stored latitude and longitude data, the pictorial map data, the posted speed limits, and/or the functional class information provided by the memory map device 60 so that a visual display can be presented over the signal DISPLAY to the device 22. The APIM 50 may also present the posted speed limit over a signal SPEED_LIMIT to the device 22 and the functional class information over a signal CLASS to the device 22. The APIM 50 may be configured to transmit the signals SPEED_LIMIT and CLASS in response to determining that the driver of the vehicle is the secondary driver. The APIM 50 receives the signal DRIVER_STATUS_1 to determine the identity of the driver. In general, the device 22 is configured to dynamically detect the posted speed limits for a road traveled by a secondary driver and to generate an alert in response to detecting that the vehicle is traveling at a speed that exceeds the posted speed limit. The device 22 may receive a signal VEH_SPEED from the PCM 38 that indicates the speed at which the vehicle is traveling.

The device 22 may add a predetermined speed buffer to the posted speed limit as identified on the signal SPEED_LIMIT and trigger an alert (via the chimes 28, voice output 29, and/or the display 24) in the event the detected vehicle speed is above the both the posted speed limit and the predetermined speed buffer (e.g., 5 mph or other suitable speed). For example, in the event the secondary driver is driving on a road that posts a speed limit of 45 mph, the device 22 may be configured to trigger the alert in response to detecting that the speed of the vehicle is above the posted speed limit (e.g., 45 mph) and the predetermined speed buffer (e.g., 5 mph). An example of posted speed limits and corresponding predetermined speed buffer values that may be established as a look-up table in the device 22, is provided below in Table 1.

TABLE 1

| Posted Speed Limit | Predetermined Speed Buffer (units mph) |
| --- | --- |
| 0 < speed ≦ 45 | 5 |
| 46 < speed ≦ 55 | 5 |
| 56 < speed ≦ 65 | 5 |
| 66 ≦ speed | 5 |
| Unknown/Invalid | None |

The predetermined speed buffer provides some degree of flexibility (or hysteresis) for the driver in that it may not be desirable to generate the alert (or punish the driver) the moment the vehicle travels one mile above the posted speed limit.

In the event the posted speed information is not provided by or otherwise capable of being provided by the memory map device 60, the device 22 may use the functional class information on the signal CLASS. As noted above, the roads are generally assigned a functional class. In one example, the functional classes may comprise a freeway, a highway, a collector road, residential road, or other suitable road/driving surface. The device 22 may be configured to assign a speed limit to each functional class. An example of various functional classes and corresponding assigned speed limits that may be established in the device 22 as a look-up table is shown directly below in Table 2.

TABLE 2

| FUNCTIONAL CLASS | ASSIGNED SPEED LIMIT (units = mph) |
|---|---|
| FC1 | 80 |
| FC2 | 80 |
| FC3 | 65 |
| FC4 | 45 |
| FC5 | 45 |
| Not known | 80 |

The APIM 50 may transmit the signal CLASS (which includes one of the classes FC1-FC5) to the device 22. The device 22 may determine the associated speed limit based on the functional class identified. The device 22 may then compare the vehicle speed to the associated speed limit and/or to the predetermined speed threshold. In the event the device 22 determines that the vehicle is traveling at a speed that is greater than the assigned speed limit and/or the predetermined speed threshold, the device 22 may generate an alert. It is contemplated that the device 22 may either provide an alert signal via the display 24 (e.g., visual alert indicator), the chimes 28 (e.g., an audio alert), and/or the voice output 29 (e.g., text message audibly transmitted therefrom).

The audio controller 62 is operably coupled to the device 22. The controller 62 is configured to transmit audio and/or video signals to the occupant(s) in the vehicle for entertainment purposes. The device 22 may transmit a signal MUTE to the controller 62 so that the controller 62 ceases to transmit audio/video signals to the occupants while the vehicle is detected to be above the posted speed limit and/or the predetermined speed criteria. In yet another example, the signal MUTE may include one or more values which indicate the level of over speed condition so that the volume is adjusted based on the degree of the over speeding condition. For example, the device 22 may include a first value on the signal MUTE so that the audio controller 62 completely mutes the transmission of the audio and/or video signals if the secondary driver drives the vehicle well in excess of the posted speed limit and/or the predetermined speed buffer. If on the other hand, the secondary driver drives slightly over the posted speed limit and/or the predetermined speed buffer, the device 22 may include a second value on the signal MUTE so that the controller 62 marginally attenuates the volume of the audio signal.

As noted above, the system 20 may also limit speed based on the speed limit information provided by the APIM 50. For example, the device 22 may transmit a signal MAX_SPEED_CMD which includes the posted speed limit and/or the predetermined speed threshold to the PCM 38. The PCM 38 may compare the detected vehicle speed to the information contained on the signal MAX_SPEED_CMD. In the event the detected vehicle speed is above the information contained on the signal MAX_SPEED_CMD, the PCM 38 may control the engine 39 so that the speed of the vehicle falls below the information contained on the signal MAX_SPEED_CMD.

It is generally contemplated that the system 20 may generate a speed alert in the event the posted speed limit and the functional class information is not provided to the device 22. For example, if the speed limit and the functional class information are not provided to the device 22, the device 22 may trigger or generate a speed alert if the vehicle exceeds a predetermined speed value (e.g., 80 mph or other suitable speed). In addition, in the event the speed limit and the functional class information are not provided to the device 22, the PCM 38 may control the engine so that the vehicle speed falls below the predetermined speed value. In such an implementation, the device 22 may set the signal MAX_SPEED_CMD to the predetermined speed value so that PCM 38 controls the engine 39 to drive the vehicle at a speed that is below the predetermined speed value.

Figure 2:
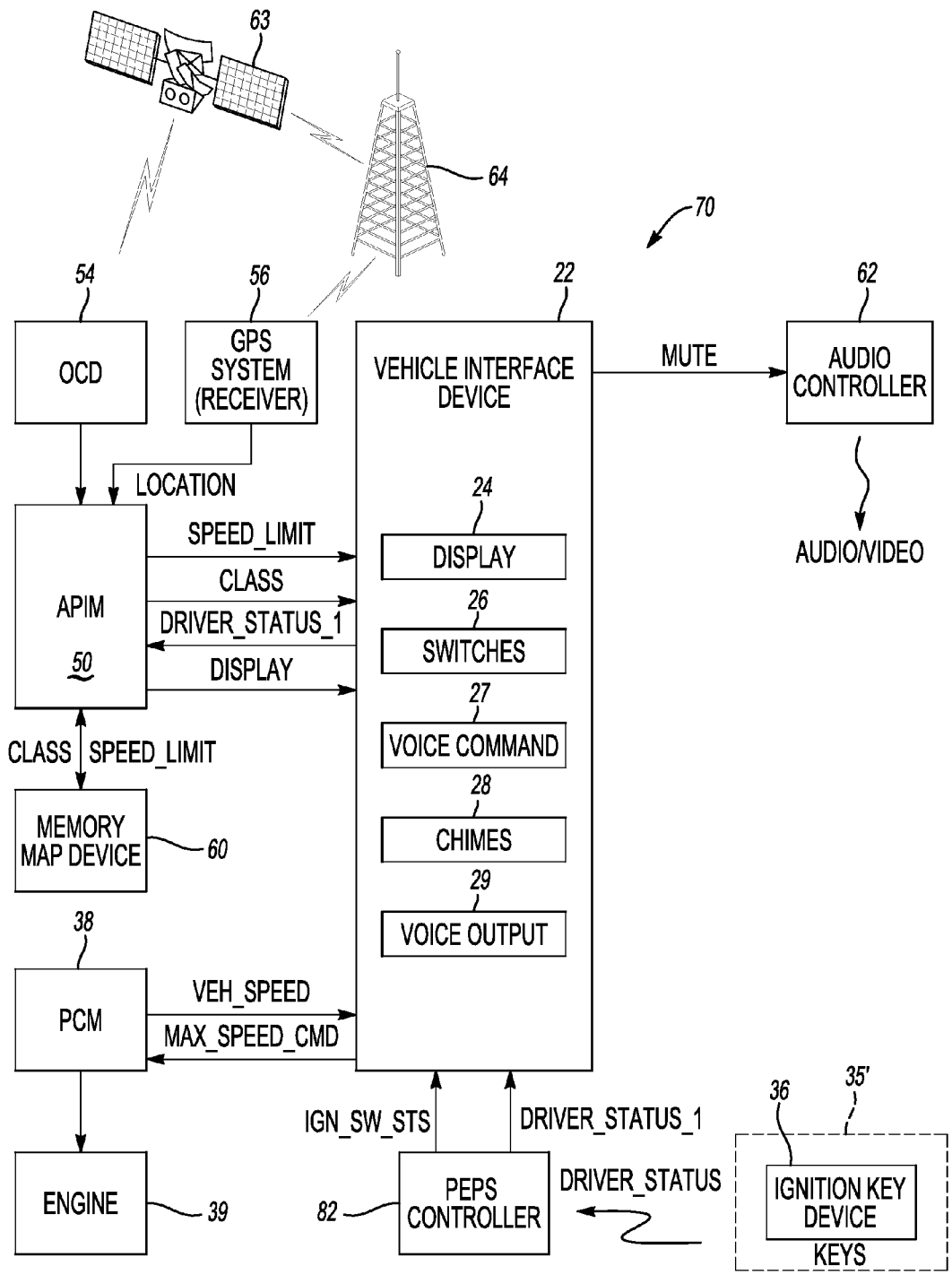
FIG. 2 depicts a system for differentiating between primary and secondary drivers of a vehicle and for dynamically generating a speed alert based on driver status in accordance to one embodiment of the present invention.

FIG. 2 depicts another system 70 for differentiating between primary and secondary drivers of a vehicle and for dynamically controlling speed limit/alert based on driver status in accordance to one embodiment of the present invention. The system 70 implements a passive entry passive start function to gain entry into and to start the vehicle as opposed to the PATS system that is used for the system 20 for starting the vehicle. A passive entry passive start (PEPS) controller 82 may be operably coupled to the device 22. While FIG. 2 generally illustrates that the PEPS controller 82 is positioned external to the device 22, additional implementations may include positioning the PEPS controller 82 within the device 22. The particular placement of the PEPS controller 82 with respect to the device 22 may vary based on the desired criteria of a particular implementation.

In general, the PEPS function is a keyless access and start system. The driver may carry one or more keys 35' that may be in the form of an electronic transmission device. The keys 35' each include the ignition key device 36 embedded within for communicating with the PEPS controller 82. The transponder of the ignition key device 36 is adapted to send the electronic code as the signal DRIVER_STATUS to the PEPS controller 82. To gain access or entry into the vehicle with the keys 35' in the PEPS implementation, the driver may need to wake up the PEPS controller 82 to establish bi-directional communication between the keys 35' and the PEPS controller 82. In one example, such a wake up may occur by requiring the driver to touch and/or pull the door handle (not shown) of the vehicle. In response to the door handle being toggled or touched, the PEPS controller 82 may wake up and transmit RF based signals to the keys 35'. The PEPS controller 82 and the keys 35' may undergo a series of communications back and forth with each other (e.g., handshaking) for vehicle access authentication purposes. The PEPS controller 82 may unlock the doors in response to a successful completion of the handshaking process. Once the driver is in the vehicle, the driver may simply press a button (not shown) positioned on an instrument panel to start the vehicle.

In one example, the system 70 may be adapted to tag or associate the keys as either a primary or a secondary key during a learn operation as discussed with the PATS controller 30. In yet another example, the system 70 may be configured to associate the keys 35' as primary or secondary keys in the manner identified and disclosed in one or more of the following U.S. patent Ser. Nos. 12/139,005, entitled "SYSTEM AND METHOD FOR PROGRAMMING KEYS TO VEHICLE TO ESTABLISH PRIMARY AND SECONDARY DRIVERS" and filed on Jun. 13, 2008; 12/433,642, entitled "SYSTEM AND METHOD FOR ASSIGNING DRIVER STATUS TO A SPARE KEY AND FOR PROGRAMMING THE SPARE KEY TO A VEHICLE" and filed on Apr. 30, 2009; and PCT/US2009/048261 entitled "SYSTEM AND METHOD FOR CONTROLLING AN ENTERTAINMENT DEVICE IN A VEHICLE BASED ON DRIVER STATUS AND A PREDETERMINED VEHICLE EVENT" and filed on Jun. 23, 2009. The PEPS controller 82 may determine the driver status based on the information indicated on the signal DRIVER_STATUS as noted in connection with the system 20 of FIG. 1.

The PEPS controller 82 is adapted to provide the signal DRIVER_STATUS_1 to the various controllers over the communication bus. The signal DRIVER_STATUS_1 corresponds to whether the driver is the primary driver or the secondary driver. The PEPS controller 82 may also transmit the signal IGN_SW_STS to the device 22. The PEPS controller 82 determines that the key ignition status is in the run position in response to the driver toggling the brake pedal (not shown) and depressing the start switch. In such a case, the vehicle is started and the PEPS controller 82 transmits the signal IGN_SW_STS as being in the run state. In the event the driver selects only the start button, the PEPS controller 82 transmits the signal IGN_SW_STS as being in the accessory state.

While FIGS. 1-2 generally disclose keys 35 and 35' that are used in connection with the PATS and PEPS implementations, respectively, it is generally contemplated that the keys may be implemented as a cell phone or other suitable switch device used to authenticate the driver to the vehicle for enabling entry into the vehicle or for starting the vehicle. Data transmitted from the cell phone may be received by a receiver (not shown) on the vehicle and decoded to perform driver authentication for gaining entry into the vehicle, starting the vehicle, and ascertaining driver status.

The system 70 operates in a similar manner to the system 20 with respect to dynamically detecting speed limits and generating alerts in response to the vehicle speed being greater than one or more of the posted speed limit and the predetermined speed criteria. The system 70 also operates in a similar to the system 20 with respect to dynamically detecting speed limits and limiting the speed of the vehicle in response to the vehicle speed being greater than one or more of the posted speed limit and the predetermined speed criteria.

Figure 3:
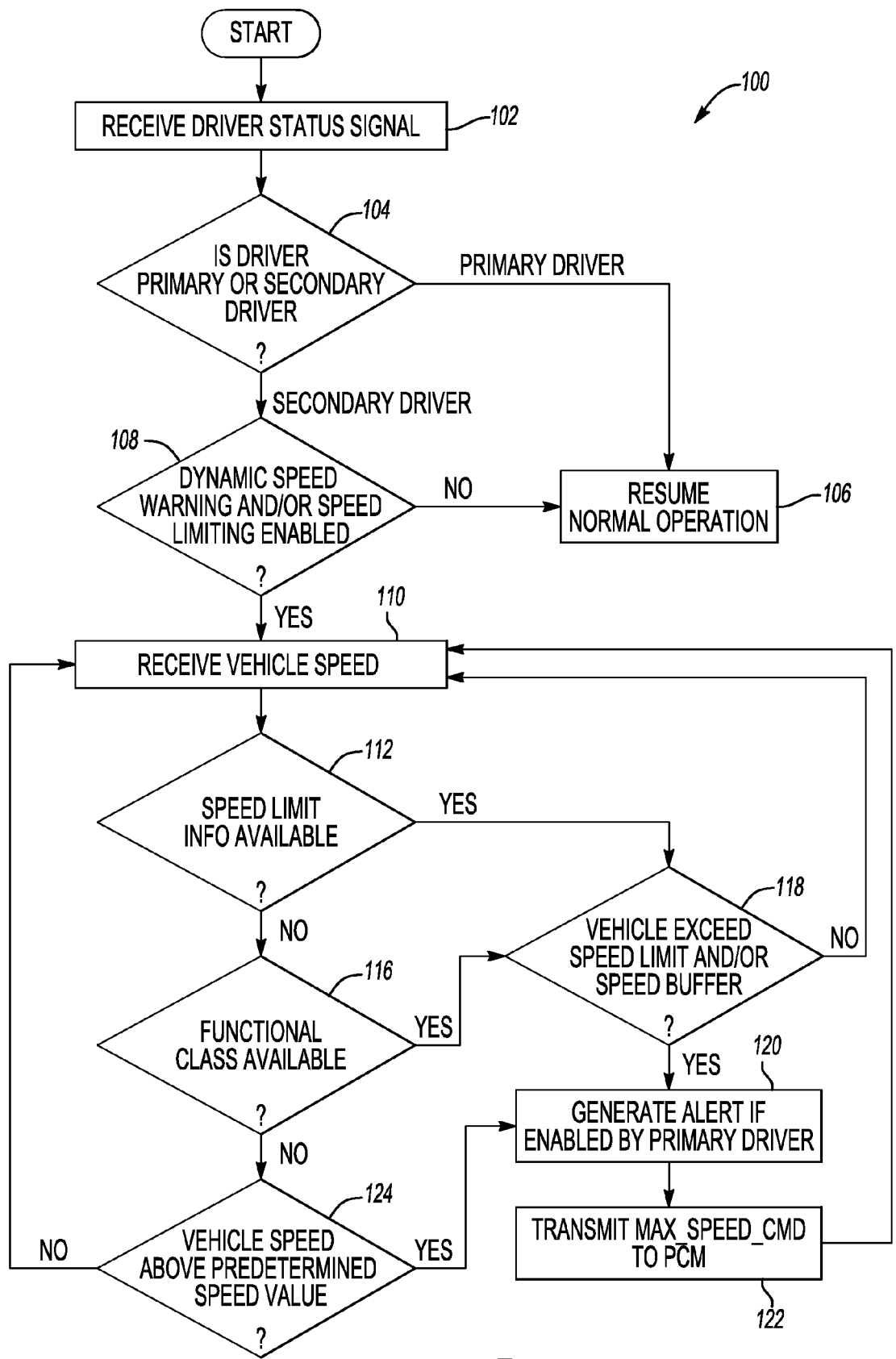
FIG. 3 depicts a method for generating a speed alert based on speed limit and driver status in accordance to one embodiment of the present invention.

FIG. 3 depicts a method 100 for generating speed alerts based on speed limit and driver status in accordance to one embodiment of the present invention. It is contemplated that the operations disclosed in connection with the method 100 may be executed in any suitable arrangement and that the operations are not intended to be executed solely in the manner shown.

In operation 102, the device 22 receives the signal DRIVER_STATUS_1 to ascertain the identity of the driver.

In operation 104, the device 22 determines whether the driver of the vehicle is the primary driver or the secondary driver. If the driver is the primary driver, then the method 100 moves to operation 106. If the driver is the secondary driver, then the method 100 moves to operation 108.

In operation 106, the device 22 resumes normal operation and there are no speed alert or speed control operations performed.

In operation 108, the device 22 determines whether the primary driver has enabled the speed alert/speed control feature for the secondary driver. The primary driver may enable (or turn on) the speed alert and/or speed control feature for the secondary driver via one or more of the user interfaces on the device 22 (e.g., display 24, switches 26, and/or voice command 27). It is contemplated that the primary driver may enable at least one of the alert feature and the speed control feature. If both the speed alert and the speed control feature are disabled, the method 100 moves to operation 106. If at least one of the speed alert and the speed control feature is enabled, then the method 100 moves to operation 110.

In operation 110, the device 22 receives vehicle speed on the signal VEH_SPEED.

In operation 112, the device 22 determines whether the posted speed limit information is available while the vehicle is being driven by the secondary driver (e.g., the device 22 monitors the signal SPEED_LIMIT). As noted above, in some instances, the posted speed limit information may not be available for a number of reasons. For example, the posted speed limit information may not be provided for a particular road that is currently being driven on by the secondary driver on the memory map device 60. If the posted speed limit information is not provided, then the method 100 moves to operation 116. If the posted speed limit information is provided, then the method 100 moves to operation 118.

In operation 116, the device 22 determines whether the functional class for a given road that is currently being driven on by the secondary driver is available (e.g., the device 22 examines data on the signal CLASS). If the functional class information is not provided, then the method 100 move to operation 124. If the functional class information is provided, then the method 100 moves to operation 118.

In operation 118, the device 22 determines whether the vehicle speed transmitted on the signal VEH_SPEED exceeds (i) the posted speed limit (as indicated on the signal SPEED_LIMIT) and/or the predetermined speed threshold or (ii) the assigned speed limit with the functional class and/or the predetermined speed threshold. If the vehicle speed does not exceed (i) or (ii) as noted directly above, then the method 100 moves back to operation 110 with no such alert or speed control being performed. If the vehicle speed exceeds (i) or (ii) as noted above, then the method 100 moves to operation 120.

In operation 120, the device 22 generates the speed alert (if speed alert feature is enabled by the primary driver).

In operation 122, the device 22 transmits the signal MAX_SPEED_CMD to the PCM 38. As noted above, the data on the signal MAX_SPEED_CMD corresponds to the posted (or assigned) speed limit and/or the predetermined speed buffer. The PCM 38 uses this data to control the engine 39 to adjust the vehicle speed so that the speed falls below the speed information provided on the signal MAX_SPEED_CMD (e.g., if the speed control feature is enabled).

In operation 124, the device 22 is not able to ascertain the posted speed limit associated with the signal SPEED_LIMIT or speed limit information associated with the functional class data (e.g., signal CLASS). In such a case, the device 22 compares the vehicle speed to a predetermined speed value (e.g., 80 mph or other suitable value). If the vehicle speed is above the predetermined speed value, the method moves to operations 120 and 122 to perform the speed alert and/or speed control features. If the vehicle speed is below the predetermined speed value, the method 100 moves back to operation 110.

Figure 4:
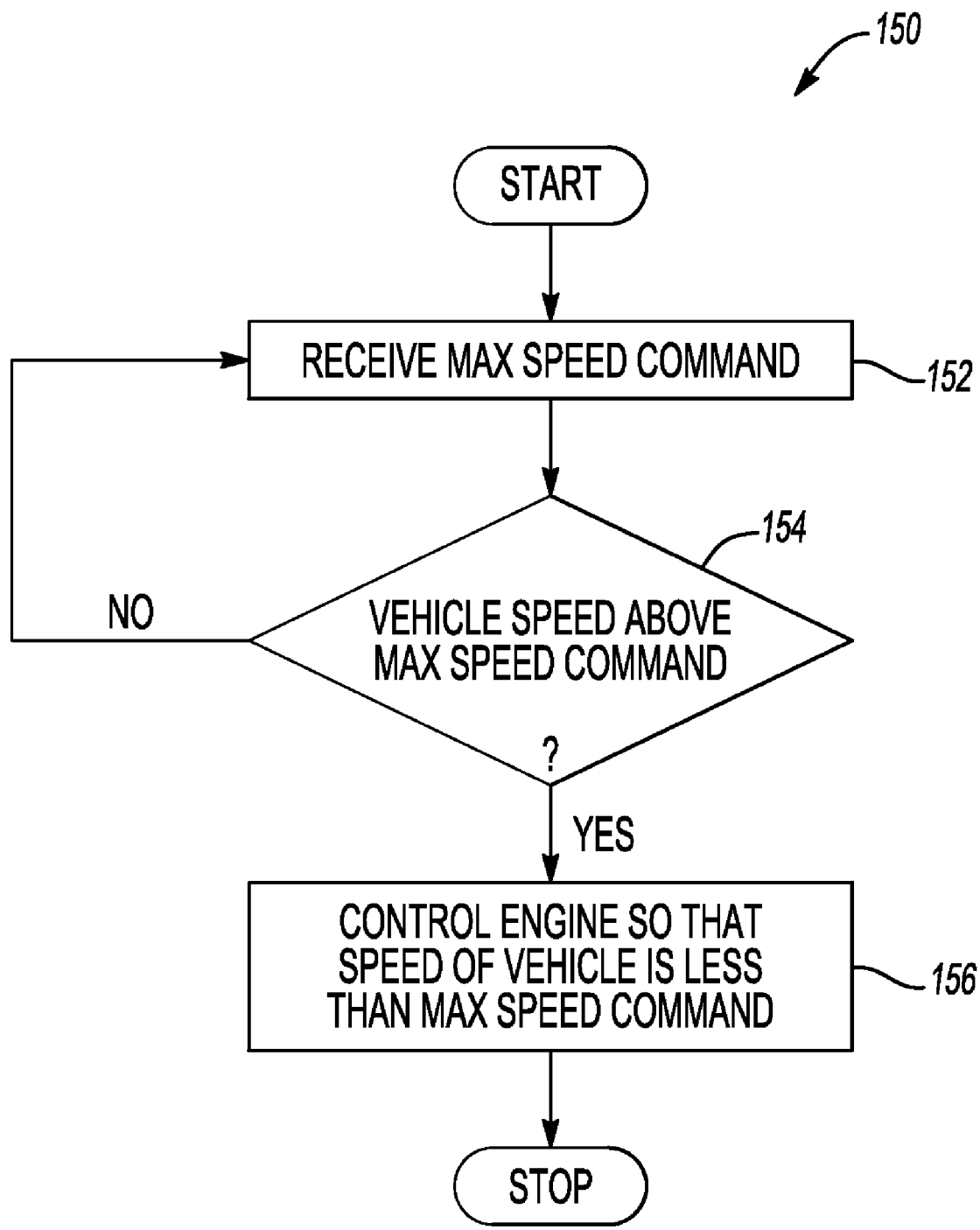
FIG. 4 depicts a method for controlling vehicle speed based on speed limit and driver status in accordance to one embodiment of the present invention.

FIG. 4 depicts a method 150 for controlling vehicle speed based on speed limit and driver status in accordance to one embodiment of the present invention. It is contemplated that the operations disclosed in connection with the method 150 may be executed in any suitable arrangement and that the operations are not intended to be executed solely in the manner shown.

In operation 152, the PCM 38 receives the signal MAX_SPEED_CMD which corresponds to the posted (or associated) speed limit and/or the predetermined speed buffer. In the event the speed limit information is not available, the device 22 transmits the predetermined speed value on the signal MAX_SPEED_CMD. As noted above, the predetermined speed value may be 80 mph or other suitable speed.

In operation 154, the PCM 38 compares the data on the signal MAX_SPEED_CMD to the vehicle speed. If vehicle speed is greater than the value of the data on the signal MAX_SPEED_CMD, then the method 150 moves to operation 156. If the vehicle speed is less than the value of the data on the signal MAX_SPEED_CMD, then the method 150 moves back to operation 152.

In operation 156, the PCM 38 controls the engine 39 so that the speed of the vehicle is reduced to a speed that is below the value indicated on the signal MAX_SPEED_CMD.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for generating a speed alert with an electronic device in a vehicle, the method comprising;
   receiving a vehicle speed signal indicating the speed at which the vehicle is traveling on a road;
   receiving a speed limit signal indicating a posted speed limit for the road traveled on by the vehicle;
   adding a predetermined speed buffer to the posted speed limit;
   comparing the posted speed limit and the predetermined speed buffer to the vehicle speed signal;
   generating an alert if the vehicle speed signal is greater than the posted speed limit and the predetermined speed buffer;
   receiving a class signal indicating a functional class for the road;
   assigning a first assigned speed limit to the functional class for the road;
   determining whether the posted speed limit is available; and
   comparing the first assigned speed limit and the predetermined speed buffer to the vehicle speed signal if the posted speed limit is unavailable.

2. The method of claim 1 further comprising receiving a driver identification signal indicating that the driver is one of a primary driver and a secondary driver.

3. The method of claim 2 wherein generating the alert further comprises generating the alert if (i) the vehicle speed signal is greater than the posted speed limit and the predetermined speed buffer and (ii) the driver identification signal indicates that the driver of the vehicle is the secondary driver.

4. The method of claim 1 further comprising generating the alert if the vehicle speed signal is greater than the first assigned speed limit and the predetermined speed buffer.

5. The method of claim 1 further comprising controlling the vehicle to reduce speed such that the vehicle speed signal is below the posted speed limit if the vehicle speed signal is greater than the posted speed limit and the predetermined speed buffer.

6. An apparatus for generating a speed alert in a vehicle for one of a primary driver and a secondary driver, the apparatus comprising;
   a device configured to:
      receive a driver status signal indicating that the driver of the vehicle is the secondary driver;
      receive a vehicle speed signal indicating the speed at which the vehicle is being driven on a road by the secondary driver;
      receive a speed limit signal indicating the posted speed limit for the road;
      compare the posted speed limit to the vehicle speed signal;
      generate an alert for the secondary driver if the vehicle speed signal is greater than the posted speed limit;
      receive a class signal indicating a functional class for the road;
      assign a first assigned speed limit to the functional class for the road;
      determine whether the posted speed limit is available; and
      compare the first assigned speed limit to the vehicle speed signal if the posted speed limit is unavailable.

7. The device of claim 6 wherein the device is further configured to generate the alert if the vehicle speed signal is greater than the first assigned speed limit.

8. The device of claim 7 wherein the device is further configured to transmit a maximum speed command signal that indicates a maximum speed limit to a control module so that the control module reduces the vehicle speed to fall below the maximum speed command signal if the vehicle speed signal is greater than the maximum speed limit.

9. An apparatus for generating a speed alert in a vehicle for one of a primary driver and a secondary driver, the apparatus comprising;
   a device configured to:
      receive a driver status signal indicating that the driver of the vehicle is the secondary driver;
      receive a vehicle speed signal indicating the speed at which the vehicle is being driven on a road by the secondary driver;
      receive a speed limit signal indicating the posted speed limit for the road;
      store a predetermined speed buffer;
      compare the posted speed limit and the predetermined speed buffer to the vehicle speed signal; and
      generate an alert for the secondary driver if the vehicle speed signal is greater than the posted speed limit and the predetermined speed buffer;
      determine whether the posted speed limit is available; and
      compare a first assigned speed limit and the predetermined speed buffer to the vehicle speed signal if the posted speed limit is unavailable.

10. The device of claim 9 wherein the device is further configured to receive a class signal indicating a functional class for the road and to assign the first assigned speed limit to the functional class for the road.

11. The device of claim 9 wherein the device is further configured to generate the alert if the vehicle speed signal is greater than the first assigned speed limit and the predetermined speed buffer.

12. An apparatus for generating a speed alert, the apparatus comprising:
   a controller configured to:
      receive a vehicle speed signal indicative of a speed the vehicle is being driven on a road;
      electronically determine whether a posted speed limit for the road is available;
      receive a class signal indicative of a functional class for the road; and
      assign a first assigned speed limit based on the functional class if the posted limit signal is unavailable.

13. The apparatus of claim 12 wherein the controller is further configured to compare the speed as indicated on the vehicle speed signal to the first assigned speed limit.

14. The apparatus of claim 13 wherein the controller is further configured to generate an alert if the speed as indicated on the vehicle speed signal is greater than the first assigned speed.

15. The apparatus of claim 14 wherein the controller is further configured to receive a driver identification signal indicative of whether the driver is one of a primary driver and a secondary driver.

16. The apparatus of claim 15 wherein the controller is further configured to generate the alert if the speed as indicated on the vehicle speed signal is greater than the first assigned speed signal and the driver is the secondary driver.

* * * * *